Nov. 6, 1934.　　　C. H. KENNEWEG　　　1,979,747
SUPERCHARGER
Filed Feb. 10, 1930　　　2 Sheets-Sheet 1

INVENTOR
Christian H. Kenneweg
by his attorney
Byrnes, Stebbins, Parmelee & Bienko

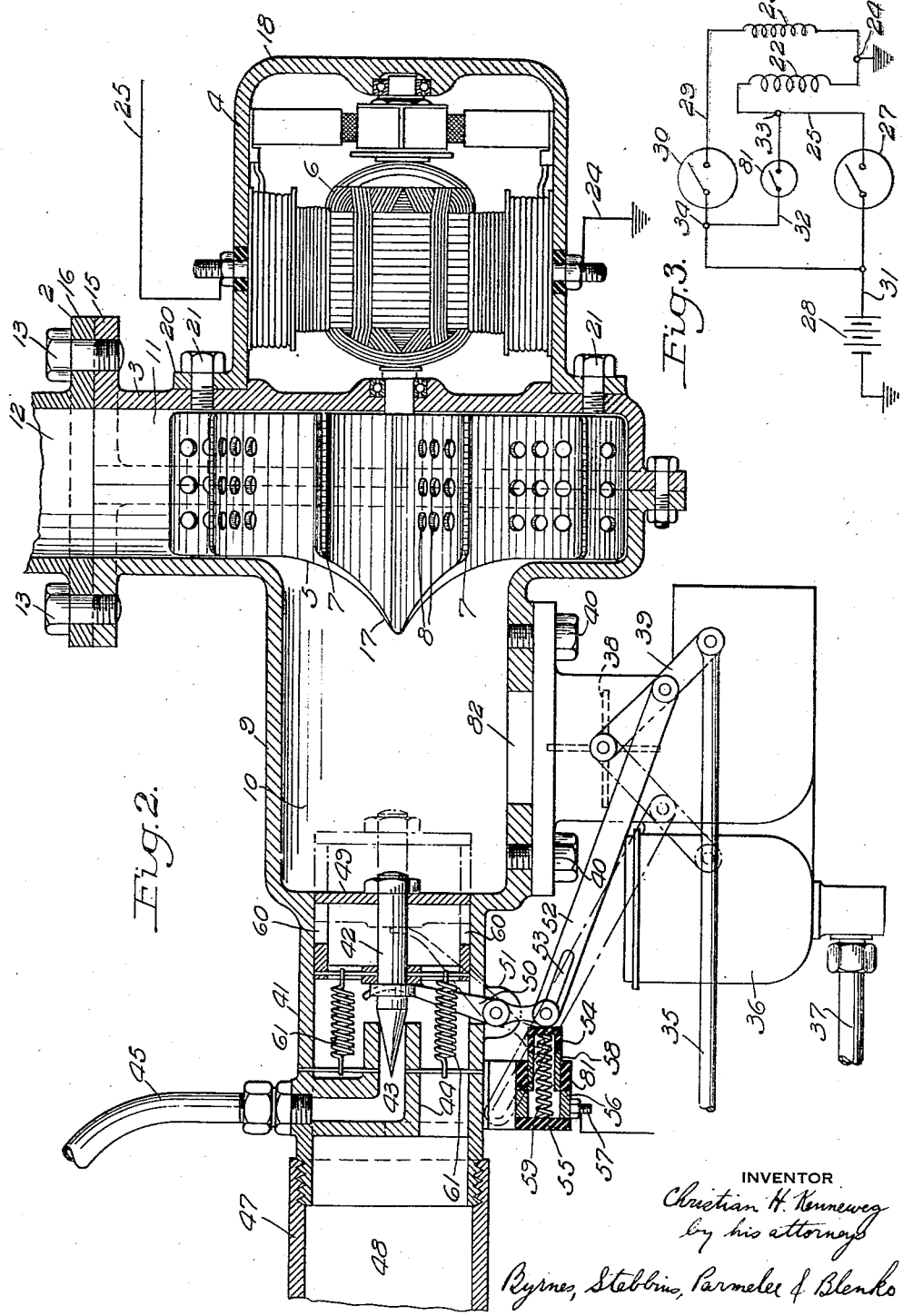

Patented Nov. 6, 1934

1,979,747

UNITED STATES PATENT OFFICE 1,979,747

SUPERCHARGER

Christian H. Kenneweg, Millvale Borough, Pa.

Application February 10, 1930, Serial No. 427,131

1 Claim. (Cl. 123—119)

My invention relates to automotive vehicles and, more particularly, to a method of and means for improving the operation of engines of automotive vehicles.

I provide a fuel for improving the operation of a conventional internal combustion engine and means which may be described as a supercharger for thoroughly mixing and forcing the fuel under pressure into the intake passages of the engine.

The herein described fuel and supercharger provides means whereby a very substantial increase in the power output may be obtained from conventional internal combustion engines, especially where the cheaper grades of gasoline are used for the primary fuel.

The herein described device provides means whereby an increase is effected in the density of the inhaled fuel charge under heavy-load or high-speed operating conditions. The fuel charge, normally comprising a mixture of atmospheric air and gasoline, i. e. hydro-carbon vapor or spray, is increased in density, preferably by reducing its average temperature due to the latent heat of evaporation of any of the various alcohols which are automatically supplied to the hydro-carbon fuel mixture under high-speed or heavy-load operating conditions.

I provide a method and means whereby the cheapest grades of gasoline fuel may be used with perfect satisfaction in normally high compression ratio engines during all starting and running conditions up to and beyond the position of throttle opening or intake manifold depression, whereat the ordinary inhaled charge reaches sufficient pressure and temperature to detonate, it being further provided that slightly before the detonation point or pressure is reached, and up to the point of maximum power output, the auxiliary alcoholic base fuel mixture-feeding apparatus begins to function so that the detonating gasoline fuel and the non-detonating auxiliary fuel are fed into the engine in certain specific quantities of each so that the meritorious properties of the different fuels are utilized to the best possible advantage.

I further provide for the addition to the auxiliary fuel of any suitable solvent for the binder, or cementing agent, that normally consolidates carbon particles, road-dust, etc. into the so-called carbon scale that accumulates on the various surfaces of the combustion chamber. The action and purpose of injecting the solvent into the combustion chamber, under heavy loads or normally high operating temperature conditions, is to destroy the adhesion of the various particles so that the scale can be broken down and carried out of the engine cylinders with the products of combustion on the exhaust stroke.

Commercialized stabilized alcohol, which is completely stabilized hydro-scopically, by the addition of a suitable amount of water, either denatured, or otherwise, when used as a fuel for internal combustion engines, burns more slowly than gasoline fuel mixtures and burns more completely over a much wider range of fuel to air-mixtures. It burns or explodes progressively without any tendency to detonate under much higher initial pressures than gasoline fuels, and due to the much higher latent heat of evaporation of alcohol, it cools and therefore increases the density of the fuel charge to a much greater extent than ordinary hydro-carbon fuels.

With these and other provisions in view, the invention consists in the construction and novel combination and arrangement of parts hereinafter fully described, illustrated in the accompanying drawings and pointed out in the claims appended hereto; it being understood that various changes in the form, proportion, and minor details of construction, within the scope of the claims may be resorted to without departing from the spirit of the invention or sacrificing any of the advantages thereof.

In the drawings,

Figure 2 is an enlarged view in cross-section of the supercharger; and

Figure 3 is an electric circuit diagram of the device illustrated in Figure 2.

Figure 1:
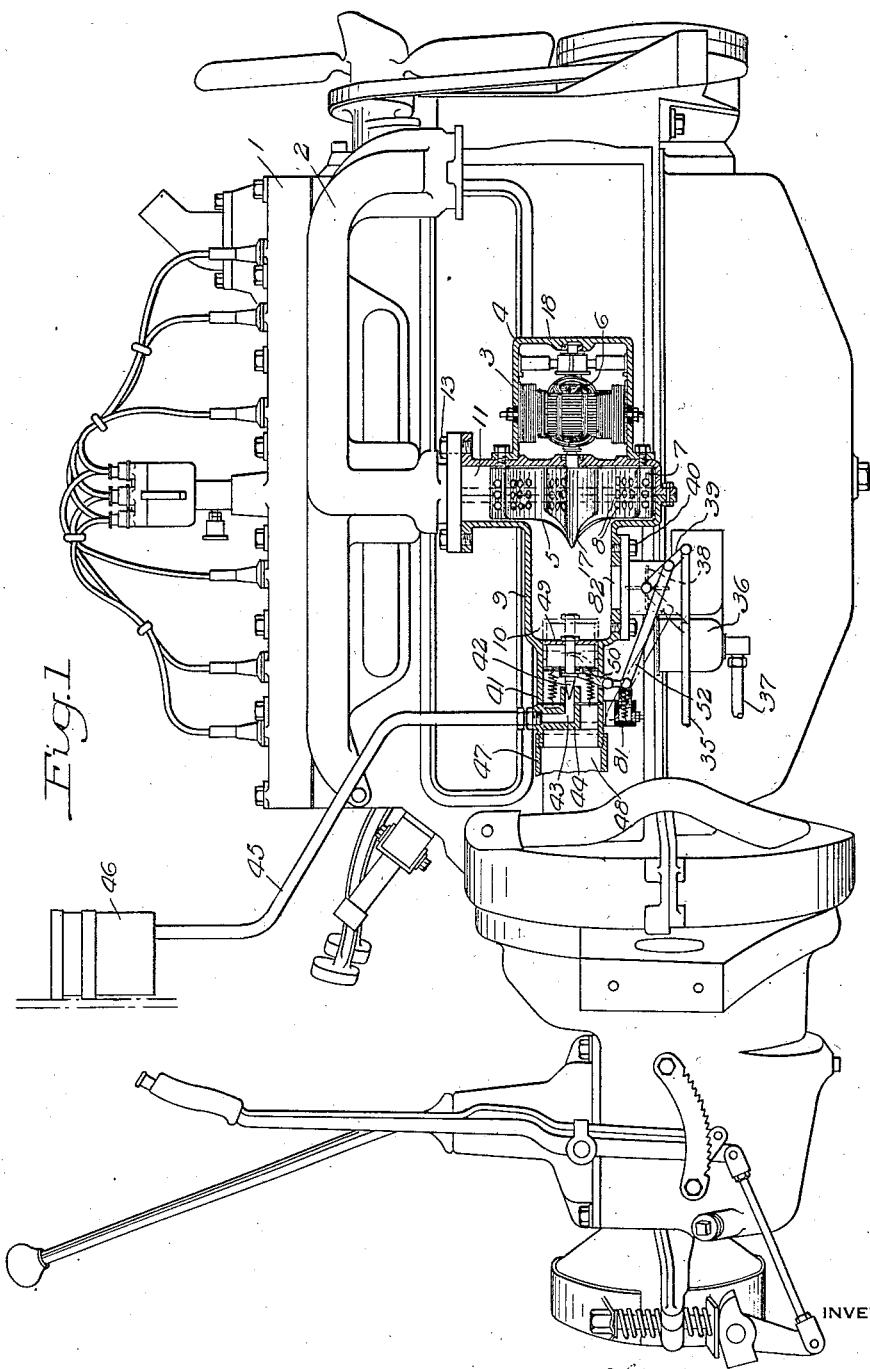
Figure 1 is a view in side elevation of an internal combustion engine that is provided with the herein described apparatus (partially shown in cross-section)

Referring to Figures 1 and 2, a modern conventional automobile internal combustion engine 1, having the usual intake manifold 2, is provided with a supercharger 3 for supplying fuel to the intake manifold 2. The supercharger 3 preferably comprises an electric motor 4 and impeller wheel 5 that is coupled to and driven by the armature 6 of the motor 4. The impeller wheel 5 consists of a plurality of radially-extending blades 7 that are curved slightly and are provided with openings 8 for passing drops of liquid fuel which accumulate on the forward surfaces of the plates back into the air stream for more complete pulverizing.

The impeller wheel 5 is provided with a suitable casing 9 having an inlet chamber 10 in front of the impeller wheel and an outlet passage 11 that registers with the passage 12 of the intake manifold 2. The casing 9 may be secured to the manifold 2 in any suitable manner, as, for example, by means of bolts 13 cooperating with corresponding shoulders 15 and 16 projecting from the passages 11 and 12 of the casing 9 and the intake manifold 2, respectively.

The blades 7 of the impeller wheel 5 are provided with curved projections 17 extending into the intake chamber 10 for the purpose of catching the vapor in the chamber.

The motor 4 is provided with a cup-shaped casing 18 that is provided with a flange 20, which is secured to the casing 9 by means of bolts 21. The motor 4 is preferably a multiple-wound motor of the shunt type. The motor 4 is preferably provided with a winding 22 and a winding 23, as shown in Figure 3.

Referring, particularly, to Figure 3, the windings 22 and 23 are connected together and to ground at point 24. The winding 22 is connected by means of a conductor 25 through a switch 27 and to one terminal of the battery 28 that is grounded at its other terminal.

The switch 27 preferably is associated with the starting motor of the automobile, so that when the starting switch is closed, the switch 27 is closed at the same time, and the winding 22 is energized by the battery 28. The energization of the winding 22 sets the motor 4 in operation, which in turn drives the impeller wheel 5 at a suitable speed for slow-speed operating conditions of the engine 1. The other winding 23 of the motor 4 is connected by means of a conductor 29 through a switch 30 associated with the ignition switch of the automobile to the positive terminal 31 of the battery 28 so that when the ignition switch of the automobile is closed, the switch 30 is closed at the same time.

A booster switch 81 is connected by means of a conductor 32 to the conductors 25 and 29 at junctions 33 and 34, respectively. The booster switch 81 is associated with the accelerator 35 in such manner that when the latter is moved to a predetermined position, the switch 81 is closed thereby placing the windings 22 and 23 in parallel circuit relation with each other. This arrangement is provided for the purpose of changing the speed of the motor 4 at a predetermined load or speed of the internal combustion engine 1.

Referring, particularly, to Figure 2, the intake chamber 10 is provided with an opening 82 which communicates with the discharge opening of a conventional carburetor 36. A connecting pipe 37 is associated with the carburetor 36 and a suitable supply tank (not shown) for the purpose of supplying a liquid fuel, preferably a gasoline-benzol mixture containing approximately 20 to 40% benzol. The carburetor 36 is of the conventional type and is provided with a butterfly valve 38 connected by means of a link 39 to the accelerator rod 35. The carburetor 36 is preferably secured to the supercharger casing 9 by means of bolts 40.

The intake chamber 10 is provided with an extension 41 for the accommodation of a needle-valve consisting of a tapered member 42 projecting into the opening 43 of a nozzle 44. The opening 43 is in communication with a pipe 45, which leads to a reservoir 46 for containing the auxiliary liquid fuel mixture. The auxiliary fuel mixture preferably comprises castor-oil, alcohol, benzol, a carbon-solvent, and an alkali.

Immediately back of the extension 41, there is provided a casing 47 which communicates with an air-heater (not shown). The hot air is supplied through the opening 48 in the casing 47 to the intake chamber 10 by way of the opening in the needle valve.

The tapered member 42 of the needle-valve is mounted in a piston 49, which is slidably fitted to the inside of the cylinder 41. The piston 49 is operated by a finger 50 that is pivoted to a projection 51 extending from the bottom of the cylinder 41. The finger or lever 50 is associated with the accelerator rod 35 by means of a connecting rod 52 that is pivoted to the link 39. A slot 53 is provided in one end of the connecting rod 52 for permitting a certain amount of motion in the rod 52 without moving the lever 50. For example, under starting and slow-speed operation conditions of the internal combustion engine, the primary gasoline fuel is fed from the carburetor 36 into the intake chamber 10, the needle leading to the auxiliary fuel under these conditions being closed by virtue of the slot 53. Where the accelerator rod 35 is moved so that the engine is working under heavy-load or high-speed conditions, however, the connecting rod 52 is caused to take a position, as indicated by the dotted lines, which opens the needle valve leading to the auxiliary fuel to improve the operation of the engine.

The piston 49 is provided with side openings or windows 60 that provide a communication between the inside of the projection 41 and the inlet chamber 10 of increasing size as the piston 49 is moved inwardly by the lever 50. Springs 61 are connected to the projection 41 and the piston 49 for the purpose of biasing the piston 49 in a closed position. The opening 60 in the piston 49 controls the magnitude of the auxiliary fuel and hot air mixture delivered to the intake chamber 10 in accordance with the position of the piston 49.

The end of the connecting rod 52 abuts the end of one of the contacts 54 of the switch 81. The switch 81 is preferably made in the form of a cylinder 55 mainly of insulating material, but having a portion 56 of conducting material connected to a tap 57. The piston contactor is also made up of a portion of insulating material and a portion 58 of conducting material so that when the bias of a spring 59, tending to push the piston 54 out of the cylinder 55, is overcome by the movement of the connecting rod 52, the conducting portions 56 and 58 touch each other and close the switch 81, thereby increasing the speed of the motor 4 thereby increasing the speed of the impeller wheel 5.

The impeller wheel 5 sucks to itself the hot air from the opening 48, the benzol and gasoline vapors from the carburetor 36, and the alcohol-benzol-castor-oil-solvent mixture from the auxiliary tank 46. Here the impeller wheel 5, running at a high velocity, thoroughly mixes and breaks-up liquid particles of the mixture and forces the resulting vapor into the opening 12 leading into the intake manifold of the engine 1.

That part of the invention pertaining to the high-speed mixing or supercharging impeller is provided essentially for the purpose of breaking up the heavy spray or drops of liquid fuel which normally require a highly heated hot-spot for the spray to impinge against, which provision in turn heats the fuel and air mixture to an abnormal extent and reduces the volumetric efficiency of the engine in a direct ratio to the increase in volume of the fuel charge.

Breaking up the fuel particles, mechanically, and thoroughly re-mixing the easily vaporized ends of the fuel with the difficult to vaporize the heavy ends of the fuel provide a homogeneous, easily distributed fuel charge at lower temperatures and therefore of greater density than can be obtained in any other way. The further provision of adding alcoholic base fuel to the gasoline base fuel and thoroughly mixing the two fuels together by means of the super-charging device, provide a means for obtaining and injecting into the engine, a normalized fuel mixture which will burn more evenly and with much less tendency to detonate than can be obtained with straight gasoline fuels.

The detonation control provided by the alcoholic base fuel is effective in direct proportion to the amount or percentage of alcohol which is supplied to the engine as a part of the gasoline fuel which is normally used. Detonation, obviously, is a product of (a) the atomic density of the carbon component of the fuel charge per unit of volume. (b) The absolute pressure in pounds per square inch to which the initial charge is compressed. (c) The absolute temperature of combustion of the reacting materials. (d) The maximum, absolute explosion pressure of the charge. (e) The valency of the elements entering into the reaction, and (f) the percentage of free nascent carbon at the critical period of combustion.

The herein described device, which functions favorably in relation to each of the above, except (E), provides an active energy producing detonation control, which has the further advantage of cooling the inhaled charge and therefore increasing its density, whereas by retaining or re-injecting exhaust or other inert gases, water or water-vapor to the inhaled charge, a more limited action as a detonation control is provided, than alcohol, together with a considerable reduction in volumetric efficiency or power-out-put which varies in direct proportion to the quantity of material used and carried in the charge.

From the above description, it will be apparent that I provide for (1) the insertion of a mechanical and chemical vaporizing or mixing supercharging device, between the carburetor or fuel or air mixing device and the intake manifold of conventional automotive engines. (2) Means to overcome and prevent objectional detonation or spark-knock, when average, untreated gasoline fuels are used, by supplying a certain quantity of alcohol and air mixture to the fuel charge. (3) Means for supplying castor-oil or other suitable lubricant, to certain moving parts of the engine, under heavy-load or high-speed operating conditions. (4) Means to supply a solvent for the binder or cementing agent, which consolidates various matter into so-called carbon-scale. (5) Means for thoroughly mixing and forcing through the intake manifold, into the engine cylinders, under increased pressure, of a homogeneous mixture of all the above materials or substances.

While I have described my device in connection with a primary fuel consisting of benzol and gasoline with alcohol as an auxiliary fuel to improve the efficiency of an internal combustion engine, nevertheless, as mentioned above, the device is equally applicable to use where gasoline is used for starting purposes and alcohol constitutes the primary fuel. In this case, by transposing the reservoirs, or the connections leading to the valves, a starting fuel consisting of 10 to 25% gasoline, may be drawn in the intake chamber 10 for starting purposes and then, after the engine is running, a fuel consisting of 75 to 90% alcohol may be fed to the intake chamber 10.

For ordinary operating conditions of the internal combustion engine up to 70% or 80% of full-load, or the detonation point, I contemplate using a primary fuel consisting of ordinary gasoline. Above the detonation point, the primary fuel is mixed with small quantities of castor-oil ($\frac{1}{16}$ to 1% by volume of the mixture), together with a mixture of hot air, benzol and alcohol. The mixture is mechanically beaten and pulverized and forced into the intake manifold of the engine by the impeller wheel.

While I have shown and described a certain present preferred embodiment and process of the invention, it is to be understood that it may be otherwise embodied within the spirit of the invention and the scope of the appended claim.

I claim:

The combination with an internal combustion engine having a carburetor and a manifold, of a supercharger inserted between said carburetor and manifold comprising a casing having an inlet opening leading to the carburetor and an outlet opening leading to the manifold, an impeller wheel mounted for rotation within said casing, a motor for driving said wheel coupled thereto, means for supplying heated air to said casing for mixing with the fuel vapor from the carburetor, means for admitting a mixture into said casing in accordance with the speed of the engine, and means for increasing the speed of the impeller wheel-motor in accordance with the quantity of said mixture, said air supply means, mixture admitting means, and motor speed control means being coupled to the carburetor control.

CHRISTIAN H. KENNEWEG.